US011153077B2

(12) United States Patent
Dreasher et al.

(10) Patent No.: US 11,153,077 B2
(45) Date of Patent: Oct. 19, 2021

(54) SECURE VEHICLE TO VEHICLE COMMUNICATION

(71) Applicant: Westinghouse Air Brake Technologies Corporation, Wilmerding, PA (US)

(72) Inventors: Rebecca W. Dreasher, Longmont, CO (US); Stephen Craven, Hiawatha, IA (US); Matthew Steven Vrba, Marion, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 188 days.

(21) Appl. No.: 16/220,959

(22) Filed: Dec. 14, 2018

(65) Prior Publication Data

US 2020/0195426 A1 Jun. 18, 2020

(51) Int. Cl.
*H04L 29/06* (2006.01)
*H04L 9/08* (2006.01)
*B61L 15/00* (2006.01)

(52) U.S. Cl.
CPC ............ *H04L 9/0825* (2013.01); *H04L 9/085* (2013.01); *H04L 9/0838* (2013.01); *H04L 63/1466* (2013.01); *B61L 15/0027* (2013.01); *B61L 15/0036* (2013.01)

(58) Field of Classification Search
CPC ..... H04L 9/0825; H04L 9/0838; H04L 9/085; H04L 63/1466; B61L 15/0027; B61L 15/0036
See application file for complete search history.

(56) References Cited

U.S. PATENT DOCUMENTS

| 7,412,059 B1 * | 8/2008 | Pauker | H04L 63/0442 380/277 |
| 8,307,208 B2 * | 11/2012 | Matsuo | H04L 9/3226 713/171 |
| 8,316,237 B1 * | 11/2012 | Felsher | H04L 9/0825 713/171 |
| 8,504,696 B2 * | 8/2013 | Larson | H04L 67/141 709/227 |
| 8,583,915 B1 * | 11/2013 | Huang | H04L 9/3236 713/155 |

(Continued)

FOREIGN PATENT DOCUMENTS

WO   WO-2016056987 A1 * 4/2016 .............. H04L 9/14

*Primary Examiner* — Sher A Khan
(74) *Attorney, Agent, or Firm* — Josef L. Hoffmann; The Small Patent Law Group LLC

(57) ABSTRACT

A system and method for a secure key exchange between two trains operating within a track network may include generating a first or second public key based on a secret random number, generating a shared secret key based on the first or second public key, authenticating one or more key exchange communications by a remote server based on a digital signature established with an on-board key associated with the first train, authenticating a communication by a remote server based on the digital signature of the second train signed with an on-board key associated with the second train, and establishing secure train-to-train communication between the two trains by generating a shared secret key based on a public key received from the other train, the secure key exchange protecting the two trains from a man-in-the-middle attack.

15 Claims, 6 Drawing Sheets

(56) References Cited

U.S. PATENT DOCUMENTS

| | | | |
|---|---|---|---|
| 2003/0222180 A1* | 12/2003 | Hart | B61L 27/0038 246/167 R |
| 2007/0106894 A1* | 5/2007 | Zhang | H04W 12/06 713/170 |
| 2010/0049819 A1* | 2/2010 | Hamada | H04L 67/322 709/207 |
| 2011/0258435 A1* | 10/2011 | Bellur | H04L 9/3268 713/158 |
| 2012/0072714 A1* | 3/2012 | Grandcolas | H04L 9/3226 713/155 |
| 2012/0324218 A1* | 12/2012 | Duren | H04L 9/0825 713/158 |
| 2014/0354402 A1* | 12/2014 | Joao | H04L 63/08 340/5.52 |
| 2015/0051761 A1* | 2/2015 | Kanner | B61L 3/121 701/20 |
| 2015/0121066 A1* | 4/2015 | Nix | H04L 9/32 713/155 |
| 2016/0039438 A1* | 2/2016 | Miyajima | B60L 3/102 701/19 |
| 2017/0026176 A1* | 1/2017 | Schmidt | H04L 9/0861 |
| 2017/0113707 A1* | 4/2017 | Ghaly | B61L 27/0077 |
| 2017/0206717 A1* | 7/2017 | Kuhnapfel | G09B 19/167 |
| 2018/0123703 A1* | 5/2018 | Xu | B61L 15/0036 |
| 2018/0227279 A1* | 8/2018 | Kim | H04W 4/70 |
| 2019/0023293 A1* | 1/2019 | Arashin | B60L 15/42 |
| 2019/0079659 A1* | 3/2019 | Adenwala | H04W 4/026 |
| 2019/0123915 A1* | 4/2019 | Simplicio, Jr. | H04W 12/0401 |
| 2019/0195644 A1* | 6/2019 | Scheufler | G05D 1/0276 |

* cited by examiner

SECURE VEHICLE TO VEHICLE COMMUNICATION

BACKGROUND

Field of the Invention

The present invention relates generally to systems and methods of secure key exchange between two locomotives operating within a track network, and in particular, to providing secure key exchange for communications used in establishing a local communication link between two trains within the track network.

Description of Related Art

At any given time within a complex track network, one or more trains may be operating and traversing a route in the track network and sending data from one to another using various radio-based methods. For example, a moving block is a signaling block system where blocks are defined in real time by computers to establish safe zones around a first train (e.g., a lead train, etc.) and a second train (e.g., a follower train, etc.). Further, the one or more trains may have on-board communication and control systems that facilitate the safe operation of the one or more trains in a local territory within the network. For example, a first train of the one or more trains on a route can listen for signals from a second train of the one or more trains to determine a train movement in a way to ensure proper separation distance to safely stop the train. In this manner, an individual train may be controlled and safely operated.

The use of such communications as part of a train control system may introduce cyber security issues. For example, in a man-in-the-middle attack (MITM), a malicious actor may insert oneself between two communicating trains (e.g., a hacker positioned within a communication range of the train, etc.) in order to detect information, cause damage, or influence train control. In a MITM attack, both communicating trains are made to believe by the malicious actor that they are communicating with another train while the malicious actor controls the communication channel to delete or modify any of the communications at will. In addition, commercial tools are now becoming more readily available for aiding a would-be malicious actor to inject himself into the middle of train-to-train communications (e.g., locomotive to locomotive, etc.), thereby increasing such attacks on exploitable systems.

In a further example, a first train may request train information of a second train by sending the request, including authentication information (e.g., a password, a one-time code from a token, etc.) to a second train. In a MITM attack, a malicious actor may intercept the train-to-train communication from the first train and pass it to the second train. In this case, the second train may then send a response to the first train when it is actually sending the message to the malicious actor. In the MITM attack, after the response is intercepted by the malicious actor, the malicious actor is free to modify the response, including one or more other communications, and pass the modified response back to the first train. When the first train receives the modified response from the malicious actor, the first train has no information to determine the actual sender (e.g., the malicious actor) and may believe (e.g., determine, etc.) that the response is a secure communication from the second train. At this point, the malicious actor has gained control of the communications channel and may send any spoofed messages directly to the first train and/or the second train. In this attack, public keys, two-factor authentication mechanisms, mutual authentication, digital signatures, etc., are insufficient to certify that the source of the message is the trusted second train, and the first train may not have, nor obtain, information to determine that the message was sent from the second train instead of a nefarious actor.

SUMMARY

In some non-limiting embodiments or aspects, provided are train-to-train key exchange systems, computer-implemented methods in a railway, and computer program products for secure train-to-train communication. Preferably, provided are improved systems, methods, and computer program products that overcome certain deficiencies and drawbacks associated with existing computing systems, methods, and computer program products for providing a train-to-train key exchange.

In some non-limiting embodiments or aspects, provided is a computer-implemented method of train-to-train key exchange. The method may include: generating a first secret random number and a first public key based on the first secret random number; generating a shared secret key based on a second secret random number and the first public key; authenticating an access request based on a digital signature of the first train signed with a first on-board key associated with the first train; and authenticating an access response based on a digital signature of the second train signed with a second on-board key associated with the second train.

In another non-limiting embodiment or aspect, provided is a train-to-train key exchange system. The system may include: a first communication device associated with a first on-board computer of a first train configured to: receive a locomotive identifier associated with a locomotive of a first train; and generate a first secret random number and a first public key based on the first secret random number; a second communication device associated with a second on-board computer of a second train configured to: generate a shared secret key based on a second secret random number and the first public key; and a central office server, including a communication device and one or more processors, configured to: authenticate an access request based on a digital signature of the first train signed with a first on-board key associated with the first train; and authenticate an access response based on a digital signature of the second train signed with a second on-board key associated with the second train.

In another non-limiting embodiment or aspect, provided is a peer-to-peer key exchange method. The method may include: receiving an access request including a first public key generated by a first on-board computer based on a first secret random number, for securing a peer-to-peer communication between a first train and a second train; authenticating the access request based on a first on-board key associated with the first locomotive, the access request including a locomotive identifier of a constraining locomotive, public key information, and a digital signature; receiving an access response including a second public key generated by a second on-board computer, the second public key based on a second secret random number and at least a portion of the first public key information; and authenticating the access response based on a digital signature of the second train signed with a second on-board key associated with the second train.

The present invention is neither limited to nor defined by the above summary. Rather, reference should be made to the claims for which protection is sought with consideration of equivalents thereto.

Further preferred and non-limiting embodiments or aspects will now be described in the following numbered clauses:

Clause 1: A computer-implemented method, comprising: generating, with a first computing device of a first train having one or more processors, a first secret random number and a first public key based on the first secret random number; generating, with a second computing device of a second train having one or more processors, a second secret random number and a second public key based on the second secret random number; authenticating, with a central office server having one or more processors, the first public key based on a first private key associated with the first train; authenticating, with the central office server, the second public key of the second train based on a second private key associated with the second train; generating, with the first computing device, a shared secret key based on the first secret random number and the second public key authenticated by the central office server; generating, with the second computing device, the shared secret key based on the second secret random number and the first public key authenticated by the central office server; and communicating between the first train and the second train by securing a communication channel with the shared secret key based on at least one of the first public key or the second public key.

Clause 2.: The method according to clause 1, comprising: receiving, with the first computing device, a locomotive identifier associated with a locomotive of the second train for determining an access request; and sending, with the first computing device, a digitally signed first public key to the central office server based on the first private key, wherein the first private key is assigned to a first locomotive of the first train.

Clause 3: The method according to clauses 1 and 2, wherein sending the digitally signed first public key to the central office server further comprises: sending a request for a locomotive address of a second locomotive including the locomotive identifier associated with the locomotive of the second train.

Clause 4: The method according to clauses 1-3, wherein receiving the locomotive identifier comprises: receiving a conditional movement authority including the locomotive identifier, the conditional movement authority associated with the locomotive of the second train in a railway network.

Clause 5: The method according to clauses 1-4, comprising: receiving, with the second computing device, a digitally signed first locomotive address associated with a locomotive of the first train for generating the communication channel; and generating a secure communication channel based on the first locomotive address by authenticating the digitally signed first locomotive address using the shared secret key associated with the locomotive of the first train.

Clause 6: The method according to clauses 1-5, comprising: sending, by the central office server, at least one of a first locomotive address associated with a locomotive of the first train or a second locomotive address associated with a locomotive of the second train.

Clause 7: The method according to clauses 1-6, further comprising: determining the shared secret key based on a public key and a secret random number; securing at least one peer-to-peer communication channel between the first train and the second train based on the shared secret key; and communicating train movement information between the first train and the second train via the at least one secure peer-to-peer communication channel.

Clause 8: The method according to clauses 1-7, comprising: preventing a man-in-the-middle attack, by securing at least one of a locomotive-to-central office communication, a central office-to-locomotive communication, or a locomotive-to-locomotive communication.

Clause 9: The method according to clauses 1-8, wherein the locomotive-to-central office communication and the central office-to-locomotive communication are authenticated based on a predetermined private key associated with a respective locomotive on-board computer.

Clause 10: The method according to clauses 1-9, comprising: generating a locomotive public key based on a DH modulus, a DH base, and a secret random number, wherein a locomotive key request includes at least one of a locomotive identifier, a locomotive public key, a DH modulus, or a DH base; and sending a message to a locomotive associated with a conditional movement authority after signing with a locomotive key.

Clause 11: A train-to-train key exchange system, comprising: a first on-board computer of a first train comprising one or more processors configured to: generate a first secret random number and a first public key based on the first secret random number; and send a digitally signed first public key to a central office server based on a first private key associated with the first on-board computer; a second on-board computer of a second train comprising one or more processors configured to: generate a second secret random number and a second public key based on the second secret random number; and send a digitally signed second public key to a central office server based on a private key associated with the second on-board computer; a central office server comprising one or more processors configured to: authenticate the first public key of the first train based on the private key associated with the first train; authenticate the second public key of the second train based on the second private key associated with the second train; send a secure second public key to the first train by digitally signing with the private key associated with the first train; and send a secure first public key to the second train by digitally signing with the private key associated with the second train, wherein the first on-board computer generates a shared secret key based on the first secret random number and the second public key, wherein the second on-board computer generates the shared secret key based on the second secret random number and the first public key, and wherein the shared secret key is used to authenticate communication between the first train and the second train.

Clause 12: The system of claim 11, wherein the first on-board computer is further configured to: receive a locomotive identifier associated with a locomotive of the second train for determining an access request; and send the digitally signed first public key to the central office server based on the first private key, wherein the first private key is assigned to a first locomotive.

Clause 13: The system according to clauses 11 and 12, wherein sending the digitally signed first public key to the central office server further comprises: sending a request for a locomotive address including a locomotive identifier of the second train to the central office server.

Clause 14: The system according to clauses 11-13, wherein the first on-board computer is further configured to receive a locomotive identifier by: receiving a conditional movement authority including the locomotive identifier, the conditional movement authority associated with the second train in a railway network.

Clause 15: The system according to clauses 11-14, wherein the second on-board computer is further configured to: receive a digitally signed first locomotive address associated with a locomotive of the first train for generating a communication channel; and generate a secure communication channel based on the first locomotive address by authenticating the digitally signed first locomotive address using the shared secret key associated with the locomotive of the first train.

Clause 16: The system according to clauses 11-15, wherein the central office server is further configured to: send at least one of a first locomotive address associated with a locomotive of the first train or a second locomotive address associated with a locomotive of the second train.

Clause 17: wherein the first on-board computer is further configured to: determine the shared secret key based on a public key and a secret random number; secure at least one peer-to-peer communication channel between the first on-board computer of the first train and the second on-board computer of the second train based on the shared secret key; and communicate train movement information between the first train and the second train via the at least one secure peer-to-peer communication channel.

Clause 18: The system according to clauses 11-17, wherein the train-to-train key exchange system is configured to prevent a man-in-the-middle attack, by securing at least one of a locomotive-to-central office communication, a central office-to-locomotive communication, or a locomotive-to-locomotive communication.

Clause 19: The system according to clauses 11-18, wherein the locomotive-to-central office communications and the central office-to-locomotive communications are authenticated based on a predetermined private key associated with a respective locomotive on-board computer.

Clause 20.) A computer program product comprising at least one non-transitory computer-readable medium including program instructions that, when executed by at least one processor, cause a first computer to: generate a first secret random number and a first public key based on the first secret random number; and send a digitally signed first public key to a central office server based on a first private key associated with a first train; cause a second computer with one or more processors to: generate a second secret random number and a second public key based on the second secret random number; and send a digitally signed second public key to the central office server based on a second private key associated with a second train; cause a third computer with one or more processors to: authenticate the first public key of the first train based on the first private key associated with the first train; authenticate the second public key of the second train based on the second private key associated with the second train; send a secure second public key to the first train by digitally signing with a private key associated with the first train; and send a secure first public key to the second train by digitally signing with a private key associated with the second train, wherein the first computer generates a shared secret key based on the first secret random number and the second public key, wherein the second computer generates the shared secret key based on the second secret random number and the first public key, and wherein the shared secret key is used to authenticate communication between the first train and the second train.

DETAILED DESCRIPTION

Figure 1:
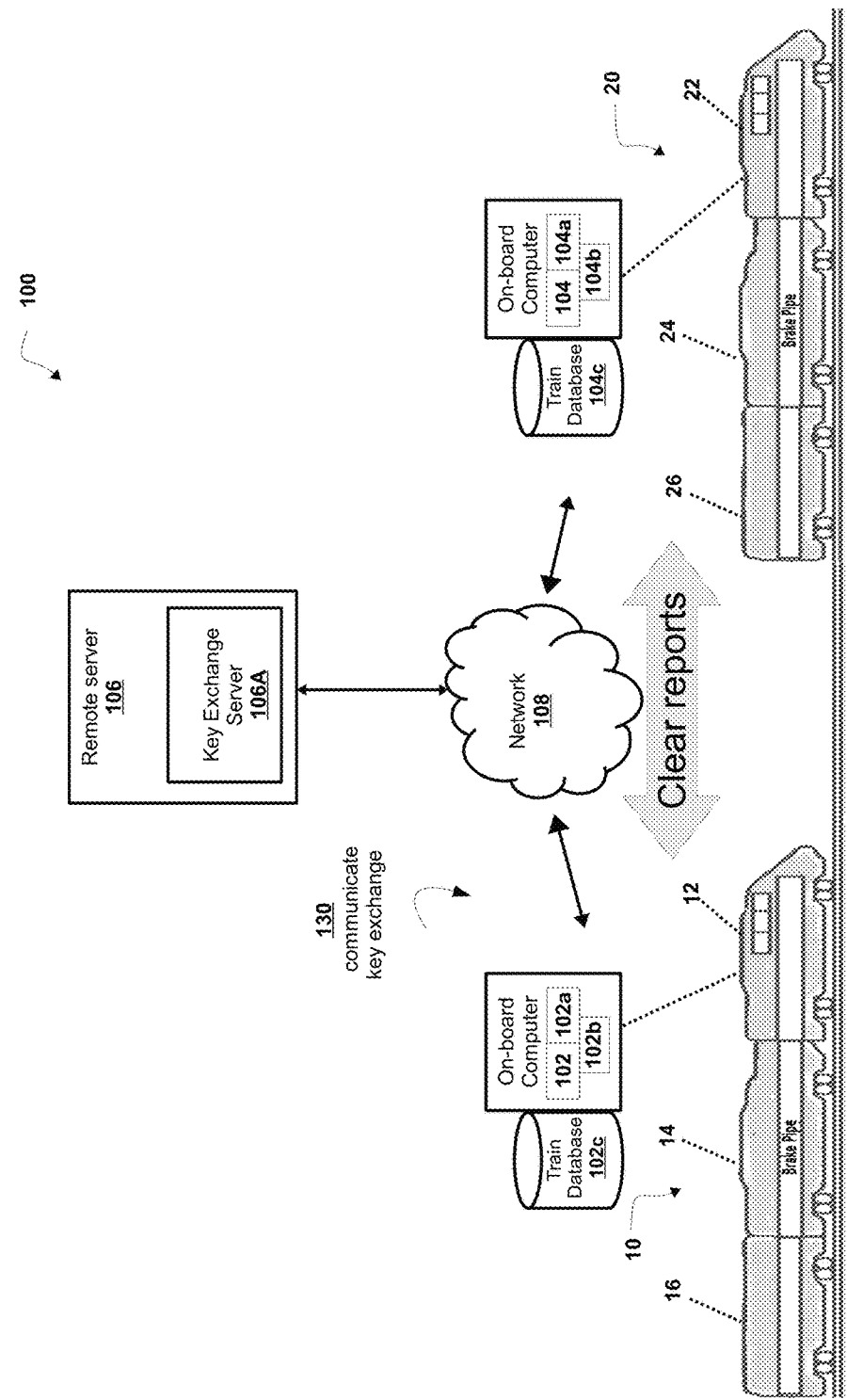
FIG. 1 illustrates a train-to-train key exchange system according to some non-limiting embodiments or aspects.

Two trains involved in a communication exchange may be vulnerable to a man-in-the-middle attack (MITM) due to limited information about one another's identities prior to establishing communication. A malicious actor may exploit such deficiencies in a communication exchange by gaining control of the communication exchange when the first train cannot distinguish between communications sent by the malicious actor and the second train. Train control systems may not provide sufficient identifying content to authenticate communication as coming from a particular train of the one or more trains. Additionally, the intermittent and asynchronous nature of train-to-train communication may provide the extra time a malicious actor needs to gain information that can be used to adequately impersonate both trains.

As disclosed herein, in some non-limiting embodiments or aspects, a computer-implemented method of train-to-train key exchange may include: generating a first secret random number and a first public key based on the first secret random number; generating a shared secret key based on a second secret random number and the first public key; authenticating an access request based on a digital signature of the first train signed with a first on-board key associated with the first train; and authenticating an access response based on a digital signature of the second train signed with a second on-board key associated with the second train. In this way, the train-to-train key exchange system may provide a first train and a second train of the two trains involved in a train-to-train communication exchange, information sufficient to acquire or more efficiently and/or securely determine the identity of another train in a conversation, provide information to establish the trustworthiness of a train identity, location, or other shared secret information to more efficiently and/or accurately establish communication is not susceptible to a MITM attack. In some non-limiting embodiments, the train-to-train key exchange system establishes sufficient identifiable context to secure a train-to-train message exchange by more securely and/or efficiently certifying one or more communications originating from both trains.

It is to be understood that the present disclosure may assume various alternative variations and step sequences, except where expressly specified to the contrary. It is also to be understood that the specific devices and processes illustrated in the attached drawings, and described in the following specification, are simply exemplary and non-limiting embodiments or aspects. Hence, specific dimensions and other physical characteristics related to the embodiments or aspects disclosed herein are not to be considered as limiting.

For purposes of the description hereinafter, the terms "end," "upper," "lower," "right," "left," "top," "bottom," and derivatives thereof shall relate to embodiments or aspects as they are oriented in the drawing figures. However, it is to be understood that embodiments or aspects may assume various alternative variations and step sequences, except where expressly specified to the contrary. It is also to be understood that the specific devices and processes illustrated in the attached drawings, and described in the following specification, are simply non-limiting exemplary embodiments or aspects. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like, are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection that is wired and/or wireless in nature. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices that are configured to directly or indirectly communicate with or over one or more networks. A computing device may be a mobile or portable computing device, a desktop computer, a server, and/or the like. Furthermore, the term "computer" may refer to any computing device that includes the necessary components to receive, process, and output data, and normally includes a display, a processor, a memory, an input device, and a network interface. A "computing system" may include one or more computing devices or computers. An "application" or "application program interface" (API) refers to computer code or other data sorted on a computer-readable medium that may be executed by a processor to facilitate the interaction between software components, such as a client-side front-end and/or server-side back-end for receiving data from the client. An "interface" refers to a generated display, such as one or more graphical user interfaces (GUI) with which a user may interact, either directly or indirectly (e.g., through a keyboard, mouse, touchscreen, etc.). Further, multiple computers, servers, or other computerized devices, such as a train including a train computing system, directly or indirectly communicating in the network environment, may constitute a "system" or a "computing system".

It will be apparent that the systems and/or methods described herein can be implemented in different forms of hardware, software, or a combination of hardware and software. The actual specialized control hardware or software code used to implement these systems and/or methods is not limiting of the implementations. Thus, the operation and behavior of the systems and/or methods are described herein without reference to specific software code, it being understood that software and hardware can be designed to implement the systems and/or methods based on the description herein.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

FIG. 1 is a diagram of a non-limiting embodiment of a train-to-train key exchange system 100 in which systems and/or methods, described herein, can be implemented. In some non-limiting embodiments of train-to-train key exchange system 100, train 10 includes a locomotive 12, one or more railcars 14, an end of train railcar 16, and train 20 includes a locomotive 22, one or more railcars 24, and an end of train railcar 26. Systems and/or devices of train-to-train key exchange system 100 can interconnect via wired connections, wireless connections, or a combination of wired and wireless connections.

With continued reference to FIG. 1, some non-limiting embodiments or aspects of train-to-train key exchange systems and methods described herein may be implemented on or in connection with an on-board computer 102 of at least one locomotive 12 in train 10, providing a communication device 102a, a display interface 102b, and a train database 102c. In some non-limiting embodiments, the on-board computer 102 may be located at any position or orientation on the train 10. In some non-limiting embodiments, the on-board computer 102 (e.g., on-board controller, on-board Positive Train Control (PTC) system, train management computer, and/or the like) performs the calculations for the train-to-train key exchange.

In some non-limiting embodiments or aspects, the on-board computer 102 provides PTC functions (e.g., train management, computer displays, cab signal monitors, brake and systems interfaces, an event recorder, etc.).

In some non-limiting embodiments or aspects, train database 102c provides a populated train database. For example, train database 102c obtains or receives data and/or information from one or more trains (e.g., train 20, etc.), one or more remote servers 106, one or more back office servers, one or more central dispatchers, and/or the like. In some non-limiting embodiments, train database 102c provides train data, such as, for example, track profile data, train data, switch location information, track heading changes (e.g., curves, and distance measurements), train consist information (e.g., the number of locomotives, the number of cars, the total length of the train, etc.), and/or the like.

With continued reference to FIG. 1, in some non-limiting embodiments or aspects, a train-to-train key exchange system 100 may include two trains as shown in FIG. 1. By way of example, train 20 includes a locomotive 22, one or more railcars 24, and an end of train railcar 26. In some non-limiting embodiments, an on-board computer 104 of at one locomotive 22 in train 20, may be the same or similar to on-board computer 102, for example, providing a communication device 104a, a display interface 104b, and a train database 104c. In some non-limiting embodiments, on-board computer 104 performs the calculations for the train-to-train key exchange (e.g., a loco-loco communication communicated between locomotive 12 of train 10 and locomotive 22 of train 20, etc.).

In some non-limiting embodiments or aspects, the on-board computer 102 also provides or is in communication with the appropriate braking system and other software or programs to effectively implement the systems and methods according to the present invention. In some non-limiting embodiments, the on-board computer 102 receives real-time input from various locomotive control settings or components, including a positioning (e.g., navigation system, mapping system, etc.) system (e.g., a GPS receiver, at least one wheel tachometer/speed sensor, and/or the like).

In some non-limiting embodiments or aspects, the on-board computer 102 provides a communication device 102a (e.g., a data radio, a transceiver, a receiver, a communication interface, a communication component, and/or the like). In some non-limiting embodiments, communication device 102a of on-board computer 102 provides secure communications by or between locomotive 10 and/or on-board computer 104 of locomotive 20 (e.g., communication device 104a, etc.) and/or one or more other on-board computers associated with one or more trains in the railway system. In some non-limiting embodiments, on-board computer 102, on-board computer 104, and remote server 106 communicate wirelessly and/or in a "hard wired" form (e.g., over the rails of the track).

In some non-limiting embodiments or aspects, on-board computer 102 provides a visual display device 102b, such as the operator's display in the cab of the locomotive 12, or visual display device 104b of locomotive 20. For example, visual display device 102b provides information and data via an electronic display interface to the operator of the train 10 regarding information associated with the on-board computer 102.

With continued reference to FIG. 1, in some non-limiting embodiments or aspects, a train-to-train key exchange system and method described herein may be implemented on or in connection with a remote server 106 (e.g., a central controller, a back office server, a remote server, central dispatch, back office PTC components, various wayside devices, such as signal or switch monitors, etc.). By way of example, in some non-limiting embodiments, remote server 106 provides key exchange server 106a for securing a communication channel associated with two trains in a railway network. In some non-limiting embodiments, on-board computer 102 (e.g., communication device 102a, etc.) and/or on-board computer 104 (e.g., communication device 104a, etc.) communicate with the remote server 106 to exchange information for generating a shared secret key.

In some non-limiting embodiments, train-to-train key exchange system 100 provides one or more key exchange messages of a key exchange protocol for establishing a secure communication (e.g., one or more secure communications, a secure communication channel, etc.) between a plurality of pairs of actors (e.g., parties, trains, locomotives, or any combination, etc.) in a railway. For example, the key exchange system 100 may include the following exchanges of information for generating a shared secret key between a first party and a second party, with authentication of a third party:

In some non-limiting embodiments or aspects, key exchange system 100 includes a first party generating a first secret random number and a first public key based on the first secret random number. For example, the first party generates the first public key based on a secret random number (e.g., a random number generated by on-board computer 102 etc.) and a modulus and base of a Diffie-Hellman protocol (e.g., shared secret key information, etc.).

In some non-limiting embodiments or aspects, key exchange system 100 includes a second party generating a second secret random number and a second public key based on the second secret random number. For example, the second party generates the second public key based on a second secret random number (e.g., a random number generated by on-board computer 104, etc.) and a modulus and base of a Diffie-Hellman protocol (e.g., shared secret key information, etc.), the modulus and base are identical to the modulus and base for generating the first public key by the first party.

In some non-limiting embodiments or aspects, key exchange system 100 includes the first party sending the first public key to the third party within a request message which is authenticated based on a private key associated with the first party. For example, the first party electronically signs the request message including the first public key with the private key associated with the first party, to securely communicate the secure information to the third party which possesses, obtains, or generates the private key associated with the first party. In some non-limiting embodiments, the third party authenticates the digital signature using the private key associated with the first party, after obtaining the private key associated with the first party.

In some non-limiting embodiments or aspects, key exchange system 100 includes the third party sending the first public key of the first party to the second party within a message which is authenticated based on a private key associated with the second party. For example, the third party electronically signs the request message including the first public key with the private key associated with the second party, to securely communicate the secure information to the second party which possesses, obtains, or generates the private key associated with the second party.

In some non-limiting embodiments or aspects, key exchange system 100 includes the second party sending the second public key to the third party within a message which is authenticated based on a private key associated with the second party. For example, the second party electronically signs the response message including the second public key with the private key associated with the second party, to securely communicate the secure information to the third party which possesses, obtains, or generates the private key associated with the second party. In some non-limiting embodiments, the third party authenticates the electronic signature using the private key associated with the second party, after obtaining the private key associated with the second party.

In some non-limiting embodiments or aspects, key exchange system 100 includes the third party sending the second public key to the first party. For example, third party sends the message providing the second public key, the message including the private key associated with the first party. For example, the third party electronically signs the response message including the second public key with the private key associated with the first party, to securely communicate the secure information to the first party which possesses, obtains, or generates the private key associated with the first party.

In some non-limiting embodiments or aspects, key exchange system 100 includes the first party generating a shared secret key based on the second public key and first secret random number. For example, in some non-limiting embodiments, the first party generates a shared secret key based on a first secret random number (e.g., the generated first secret random number, etc.) and a second public key. In some non-limiting embodiments, on-board computer 104 generates the second public key based on the second secret random number. In some non-limiting embodiments, the first party stores the first secret random number until obtaining the second public key to generate the shared secret key (e.g., a shared secret key of the first train, etc.).

In some non-limiting embodiments or aspects, key exchange system 100 includes the second party generating a shared secret key based on a first public key and the second secret random number. For example, in some non-limiting embodiments, the second party generates a shared secret key based on a second secret random number (e.g., a generated second secret random number, etc.) after receiving the first public key. In some non-limiting embodiments, the first party generates a first public key based on the first secret random number. In some non-limiting embodiments, the second party stores the shared secret key (e.g., a shared secret key of the second train, etc.).

In some non-limiting embodiments or aspects, key exchange system 100 includes authenticating a message using a shared secret key for one or more messages communicated between the first party and second party. For example, key exchange system 100 includes the first party securing a request to the second party by generating a cyclic redundancy check (CRC) over the contents of the request, and at least one of a content, timestamp, or the shared secret key (e.g. to detect changes to one or more messages, to prevent a MITM attack, etc.). Alternatively, the second party secures a request to the first party by generating a CRC over the contents of the request, and at least one of a content, timestamp, or the shared secret key.

In some non-limiting embodiments or aspects, the third party may include the remote server 106 (e.g., one or more processors of remote server 106, one or more processors of key exchange server 106a) which stores, obtains and communicates one or more key exchange message protocol communications. In some non-limiting embodiments, remote server 106 stores and or provides a locomotive electronic messaging protocol (EMP) address to another locomotive (e.g., a second locomotive's EMP address to the first locomotive, a first locomotive's EMP address to the second locomotive, etc.).

In some non-limiting embodiments or aspects, the communication network 108 includes one or more wired and/or wireless networks. For example, communication network 108 includes a cellular network (e.g., a long-term evolution (LTE) network, a third generation (3G) network, a fourth generation (4G) network, a fifth generation network (5G), a code division multiple access (CDMA) network, etc.), a public land mobile network (PLMN), a local area network (LAN), a wide area network (WAN), a metropolitan area network (MAN), a telephone network (e.g., the public switched telephone network (PSTN)), a private network, an ad hoc network, an intranet, the Internet, a fiber optic-based network, a cloud computing network, and/or the like, and/or a combination of these or other types of networks, such as electronic communication protocols and/or algorithms may be used including, for example, TCP/IP (including HTTP and other protocols), WLAN (including 802.11 and other radio frequency-based protocols and methods), analog transmissions, Global System for Mobile Communications (GSM), private wireless, public wireless, 160/220/900 MHz VHF, Wi-Fi, UHF 452-458 MHz, WiMAX, omni-directional, and/or the like.

In some non-limiting embodiments or aspects, the on-board computer 102 receives updates from some remote server or computer system (e.g., a central controller, a back office server, a remote server, central dispatch, dispatching system, communications server, back office PTC components, various wayside devices, such as signal or switch monitors, other on-board computers 12 in the railway system, etc.). For example, the on-board computer 102 receives updates from the remote server 106 associated with train 20 on the same track. For example, on-board computer 102 receives a message that indicates the location of train 20, and on-board computer 102 subsequently determines that train 10 and train 20 are too close together.

In some non-limiting embodiments or aspects, the on-board PTC computer calculates both the actual distance between the two trains as well as the safe distance between the two trains moving in the same direction. The on-board PTC commands the second train to apply brakes to slow down or stop in order to avoid a potential collision with the first train.

In some non-limiting embodiments or aspects, the on-board computer 102 of train 10 sends one or more communications to an on-board computer 104 of train 20 for position information when a train is running too close, running too fast, or is present in an upcoming block of the railway. In some non-limiting embodiments, on-board computer 102 sends one or more communications to on-board computer 104 including its identification number and location information (e.g., latitude, longitude, speed, heading, location uncertainty, etc.) for maintaining an electronic radio blocking and/or conditional movement authorities.

In some non-limiting embodiments or aspects, the on-board computer 102 sends an identification and/or the like to at least one of the on-board computer 104 or the remote server 106.

In some non-limiting embodiments or aspects, the on-board computer 104 on train 20 receives the communication from the on-board computer 102 of the train 10. In some non-limiting embodiments or aspects, the remote server 106 receives the communication from the on-board computer 102 of the train 10.

In some non-limiting embodiments or aspects, the on-board computer 104 sends an identification associated with train 20, an identification associated with train 10, and/or the like to at least one of the on-board computer 102 or the remote server 106.

Figure 2:
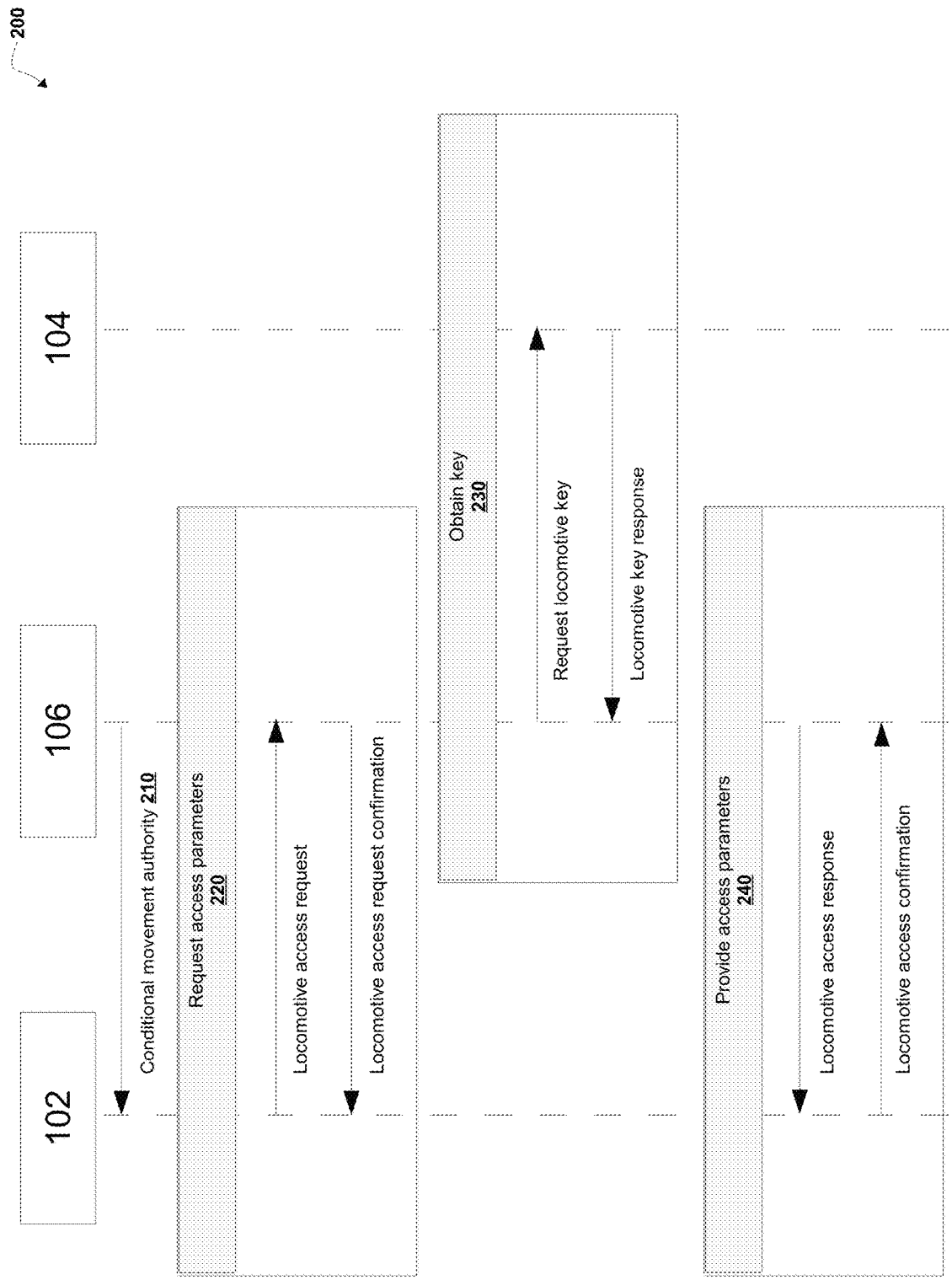
FIG. 2 illustrates a message protocol of a non-limiting embodiment or aspect of a process for communicating a key exchange.

Referring now to FIG. 2, FIG. 2 is a flow diagram of a message protocol 200 of a non-limiting embodiment or aspect for communicating a train-to-train key exchange. In some non-limiting embodiments, one or more of the steps of message protocol 200 are performed (e.g., completely, partially, etc.) by on-board computer 102, on-board computer 104, and/or remote server 106. In some non-limiting embodiments, one or more of the steps of message protocol 200 are performed (e.g., completely, partially, etc.) by another device or a group of devices separate from or including on-board computer 102 (e.g., one or more processors of on-board computer 102, one or more processors of communication device 102a, one or more processors of visual display device 102b, one or more processors of train database 102c, etc.), on-board computer 104 (e.g., one or more processors of on-board computer 104, one or more processors of communication device 104a, one or more processors of visual display device 104b, one or more processors of train database 104c, etc.), or the remote server 106 (e.g., one or more processors of remote server 106, one or more processors of key exchange server 106a, etc.).

As shown in FIG. 2, at step 210, message protocol 200 includes receiving a conditional movement authority. For example, in some non-limiting embodiments, the on-board computer 102 of train 10 receives a movement authority for first locomotive 12 (e.g., a dependent locomotive, etc.), which contains a condition based on the movement of locomotive 22 of train 20 (e.g., a constraining locomotive, etc.). In some non-limiting embodiments, the conditional authority provides a locomotive identifier of locomotive 22 of train 20 to on-board computer 102 (e.g., provides a constraining locomotive identifier to the dependent locomotive, etc.). For example, the locomotive identifier of locomotive 22 of train 20 may be associated with an address of locomotive 22 in a key exchange server 106a. In some non-limiting embodiments, the locomotive identifier of locomotive 22 of train 20 may be associated with an address (e.g., a train communication network address, etc.) of locomotive 22 in a key exchange server 106a.

As shown in FIG. 2, at step 220, message protocol 200 includes requesting access parameters. For example, in some non-limiting embodiments, the on-board computer 102 is configured to send a request for access parameters. In some non-limiting embodiments, the request for access parameters provides a request for a locomotive address of locomotive 22 of train 20 to remote server 106. For example, the request for access parameters provides a locomotive identifier of the second locomotive that may be used to determine a locomotive address of locomotive 22 of train 20.

In some non-limiting embodiments or aspects, on-board computer 102 determines a public key for authenticating a communication channel with locomotive 22 of train 20. For example, on-board computer 102 generates a public key based on a secret random number (e.g., a random number generated by on-board computer 102, etc.) and shared secret key information (e.g., a modulus and base of a Diffie-Hellman protocol, etc.).

In some non-limiting embodiments or aspects, on-board computer 102 sends the access request to remote server 106 for initiating a train-to-train key exchange, the access request including the public key, the shared secret key information, and signed with a first train on-board private key associated with first train 10 (e.g., a private key associated with locomotive 12 and known only by the remote server 106 and on-board computer 102, etc.).

In some non-limiting embodiments or aspects, the public key of the access request for parameters is associated with train 10 (e.g., a dependent locomotive, etc.). In some non-limiting embodiments, the public key associated with train 10 can decrypt one or more messages encrypted by an associated shared secret key, such as, for example, a digital signature of locomotive 12.

In some non-limiting embodiments or aspects, remote server 106 authenticates the access request for parameters based on the first locomotive private key to verify the sender of the access request for parameters of locomotive 12.

In some non-limiting embodiments or aspects, on-board computer 102 digitally signs the access request for parameters with the first locomotive private key (e.g., on-board private key, etc.) associated with train 10, and the key exchange server 106a at the remote server 106 verifies the digital signature.

In some non-limiting embodiments or aspects, remote server 106 determines a locomotive access request confirmation based on authenticating the request for access parameters. In some non-limiting embodiments, remote server 106 digitally signs a locomotive access request confirmation based on the on-board private key for locomotive 12.

As shown in FIG. 2, at step 230, message protocol 200 includes obtaining a key. For example, in some non-limiting embodiments, the remote server 106 is configured to obtain a key from a train (e.g., train 20, etc.) constraining the movement of a first train. For example, the remote server 106 is configured to send a request for a locomotive key and shared secret key information from the on-board computer 104 of second train 20 (e.g., the constraining train, etc.).

In some non-limiting embodiments or aspects, the remote server 106 determines an address of locomotive 22 from one or more addresses of one or more trains in a track network based on the locomotive identifier of the second locomotive (e.g., identifies a train, determines an address, etc.). For example, the remote server 106 determines an address of train 20 to send a locomotive key request. For example, in some non-limiting embodiments, the remote server 106 sends a request for a locomotive key based on determining an address of locomotive 22 associated with the locomotive identifier of locomotive 22 received from train 10.

In some non-limiting embodiments or aspects, remote server 106 digitally signs a locomotive key request based on the second locomotive private key (e.g., a private key associated with locomotive 22 and known only by the remote server 106 and on-board computer 104 of train 20, etc.).

In some non-limiting embodiments or aspects, on-board computer 104 receives the request for a locomotive key from remote server 106. In some non-limiting embodiments or aspects, on-board computer 104 authenticates the request for a locomotive key from remote server 106 by authenticating the digital signature based on the on-board private key of locomotive 22.

In some non-limiting embodiments or aspects, on-board computer 104 determines a public key after receiving the request for a locomotive key. For example, on-board computer 104 generates the public key based on a secret random number (e.g., a random number generated by on-board computer 104, etc.) and shared secret key information (e.g., a modulus and base of a Diffie-Hellman protocol, etc.).

In some non-limiting embodiments or aspects, the on-board computer 104 generates a shared secret key based on at least one of the first public key, the second public key, and/or the like. In some non-limiting embodiments, the on-board computer 104 stores one or more of the shared secret key, the first train public key, the second train public key, the random number generated by on-board computer 104, and/or the like.

In some non-limiting embodiments or aspects, on-board computer 104 sends a response providing a public key. For example, in some non-limiting embodiments or aspects, the train 20 sends a public key to the remote server 106 after determining the shared secret key information of train 10.

In some non-limiting embodiments or aspects, on-board computer 104 digitally signs a locomotive key response based on the second train on-board private key (e.g., second locomotive private key, etc.).

In some non-limiting embodiments or aspects, key exchange server 106a of remote server 106 receives the locomotive key response from on-board computer 104 including a public key of locomotive 22. In some non-limiting embodiments or aspects, key exchange server 106a authenticates the locomotive key response from on-board computer 104 by authenticating the digital signature based on the on-board private key of locomotive 22.

As shown in FIG. 2, at step 240, message protocol 200 includes providing access parameters. For example, in some non-limiting embodiments, the key exchange server 106a of remote server 106 is configured to provide an access parameter response with a locomotive address and the second public key associated with the second train 20 to the first train 10 after the key exchange server 106a at the remote server 106 verifies the digital signature of locomotive 22 of second train 20. For example, the remote server 106 sends an access parameter response to the first locomotive 12 providing a public key of the locomotive 22 of second train 20 and a second train address for communicating with locomotive 22 of second train 20.

In some non-limiting embodiments or aspects, step 240 includes providing a locomotive access confirmation. For example, in some non-limiting embodiments, on-board computer 102 receives and authenticates the access parameter response with the first locomotive private key. In some non-limiting embodiments, on-board computer 102 stores the locomotive address of the second locomotive 22 and the second public key from the key exchange server 106a. In some non-limiting embodiments, on-board computer 102 of locomotive 12 sends the locomotive access confirmation to the key exchange server 106a after receiving the access parameter response. For example, on-board computer 102 of locomotive 12 sends the locomotive access confirmation after authenticating the signed access parameter response with the first locomotive private key, after generating a shared secret key based on the second public key, after storing the locomotive address of the locomotive 22, after establishing a secure communication channel between the first locomotive 12 and the second locomotive 22, and/or the like. In some non-limiting embodiments, the locomotive access confirmation provides an indication that the locomotive access was successful, including a locomotive identifier of the first locomotive 12.

In some non-limiting embodiments or aspects, the on-board computer 102 generates a shared secret key based on receiving the second train public key, the shared secret key based on at least one of the shared secret key information of train 10, the first train public key, the random number generated by on-board computer 102, and/or the like. In some non-limiting embodiments, the on-board computer 102 stores one or more of the shared secret keys, the first train public key, the second train public key, the second secret random number generated by on-board computer 102, the locomotive address of the locomotive 22, and/or the like. In some non-limiting embodiments, on-board computer 102 of locomotive 12 sends the locomotive access confirmation to key exchange server 106a after storing the second public key and the locomotive address of the locomotive 22.

In some non-limiting embodiments or aspects, the on-board computer 102 sends a secure request (e.g., a signed request, etc.) to locomotive 22 of second train 20 (e.g., to register for clear reports, etc.) including the shared secret key. For example, in some non-limiting embodiments, the on-board computer 102 of train 10 communicates (e.g., registers with a constraining train, etc.) based on a conditional authority for locomotive 12 (e.g., dependent locomotive, etc.), to receive updates from a constraining train 20 for a conditional movement based on the movement of locomotive 22 of train 20.

In some non-limiting embodiments or aspects, on-board computer 102 secures a request to on-board computer 104 (e.g., to register for clear reports, etc.) by generating a cyclic redundancy check (CRC) over the contents of the request to register and the shared secret key to detect changes to one or more messages between a first locomotive 12 and a second locomotive 22 (e.g., to detect accidental, fraudulent, nefarious changes and/or behavior, etc.). In some non-limiting embodiments, on-board computer 102 secures a request to register for clear reports by generating a cyclic redundancy check (CRC) over the contents of the request to register, a timestamp, and the shared secret key.

In some non-limiting embodiments or aspects, the on-board computer 104 of locomotive 22 authenticates the secure request from locomotive 12 to register for clear reports based on the CRC. For example, on-board computer 104 authenticates the CRC over the contents of the request to register, the shared secret key, and/or a timestamp to detect changes to one or more messages between a first locomotive 12 and a second locomotive 22.

In some non-limiting embodiments or aspects, the on-board computer 104 sends a signed response to locomotive 12 of first train 10 based on a CRC over the contents of the response to register and the shared secret key to detect changes to one or more messages between a first locomotive 12 and a second locomotive 22. In some non-limiting embodiments, on-board computer 102 of locomotive 12 sends the locomotive access confirmation to key exchange server 106a after authenticating the signed response from locomotive 22.

In some non-limiting embodiments or aspects, after confirming registration, on-board computer 104 secures one or more communications with on-board computer 102 by generating a cyclic redundancy check (CRC) over the contents of the one or more requests to register, a timestamp, and the shared secret key. In some non-limiting embodiments, on-board computer 102 secures one or more communications with on-board computer 104 by generating a cyclic redundancy check (CRC) over the contents of the one or more requests to register, a timestamp, and the shared secret key. For example, on-board computer 104, on retrieval of a new request or response, repeats a CRC calculation, and in the event the CRC values do not match, a safe and/or corrective action can be taken.

Figure 3:
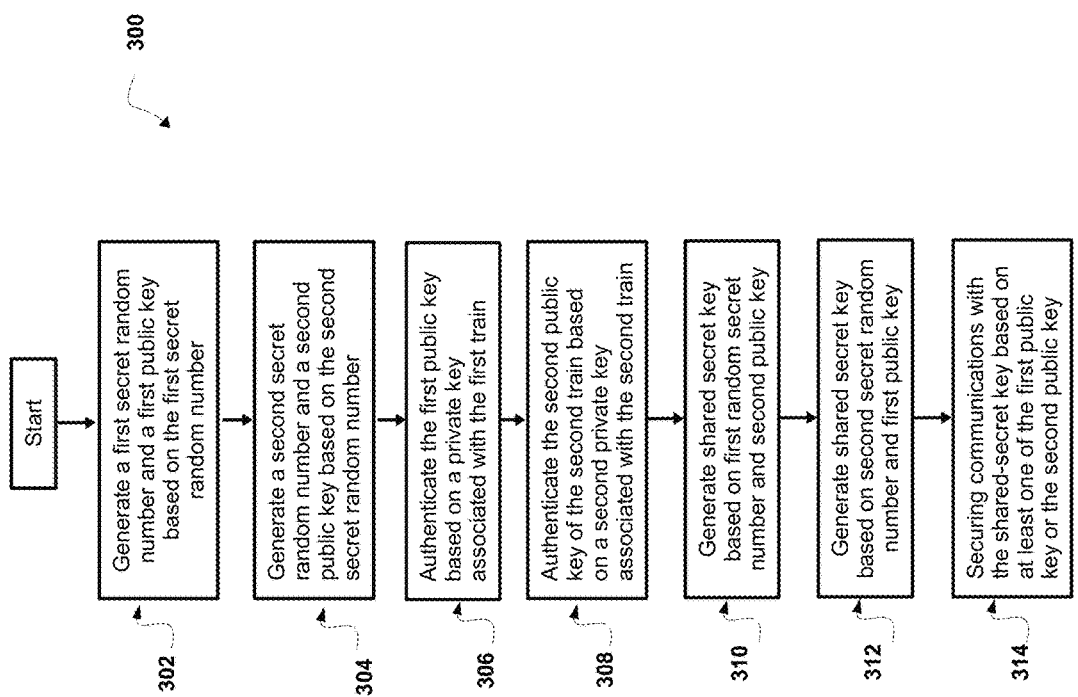
FIG. 3 illustrates a flowchart of a non-limiting embodiment or aspect of a process for train-to-train key exchange.

Referring now to FIG. 3, FIG. 3 is a flowchart of a non-limiting embodiment of a process 300 for a train-to-train key exchange. In some non-limiting embodiments, one or more of the steps of process 300 are performed (e.g., completely, partially, etc.) by on-board computer 102, on-board computer 104, and/or remote server 106. In some non-limiting embodiments, one or more of the steps of message protocol 300 are performed (e.g., completely, partially, etc.) by another device or a group of devices separate from or including on-board computer 102 (e.g., one or more processors of on-board computer 102, one or more processors of communication device 102a, one or more processors of visual display device 102b, one or more processors of train database 102c, etc.), on-board computer 104 (e.g., one or more processors of on-board computer 104, one or more processors of communication device 104a, one or more processors of visual display device 104b, one or more processors of train database 104c, etc.), or the remote server 106 (e.g., one or more processors of remote server 106, one or more processors of key exchange server 106a, etc.).

As shown in FIG. 3, at step 302, process 300 includes generating a first secret random number and a first public key based on the first secret random number. For example, in some non-limiting embodiments, the on-board computer 102 generates a first secret random number and a first public key based on the first secret random number.

In some non-limiting embodiments, process 300 includes receiving a locomotive identifier associated with a locomotive 22 of the second train 20 for determining the access request. For example, in some non-limiting embodiments, on-board computer 102 receives a locomotive identifier from remote server 106 associated with a locomotive 22 of the second train 20 for determining the access request. For example, the locomotive identifier is associated with a second train and/or a first train, for determining a train address associated with the locomotive identifier at the remote server 106. In some non-limiting embodiments, on-board computer 102 receives a conditional movement authority including the locomotive identifier when receiving the second train locomotive identifier associated with a second locomotive of the second train in a railway.

In some non-limiting embodiments or aspects, process 300 includes generating the access request for securing messages with the locomotive identifier associated with a locomotive 22 of the second train 20. For example, in some non-limiting embodiments, on-board computer 102 generates a request for access parameters including at least a locomotive identifier associated with a second train 20 associated with the conditional movement authority including the first train 10.

In some non-limiting embodiments or aspects, process 300 includes generating and/or sending the access request by generating a request for a locomotive address associated with the locomotive identifier associated with a locomotive 22 of the second train 20.

In some non-limiting embodiments, process 300 includes sending a first locomotive address associated with a locomotive 12 of the first train 10 for determining the access response. For example, in some non-limiting embodiments, remote server 106 (e.g., central office server, etc.) sends a second locomotive address associated with a locomotive 22 of the second train 20 (e.g., a constraining train, etc.) to a first train 10 for determining the access request.

As shown in FIG. 3, at step 304, process 300 includes generating a second secret random number and a second public key based on the second secret random number. For example, in some non-limiting embodiments, on-board computer 104 generates a second secret random number and a second public key based on the second secret random number. In some non-limiting embodiments, on-board computer 104 generates a second public key based on the second secret random number. In some non-limiting embodiments, the on-board computer 104 stores a shared secret key (e.g., a shared secret key of the second train, etc.), generated based on the second secret random number and the first public key.

In some non-limiting embodiments, on-board computer 104 receives a first locomotive address associated with a locomotive 12 of the first train 10 for determining the access response. In some non-limiting embodiments, on-board computer 104 generates the access response for securing messages with the locomotive identifier associated with a locomotive 12 of the first train 10.

In some non-limiting embodiments, process 300 includes sending a first locomotive address associated with a locomotive of the first train for determining the access response. For example, in some non-limiting embodiments, remote server 106 (e.g., central office server, etc.) sends a first locomotive address associated with a locomotive 12 of the first train 10 (e.g., dependent locomotive, etc.) to a second train 20 for determining the access response.

As shown in FIG. 3, at step 306, process 300 includes authenticating the first public key based on a first private key associated with the first train. For example, in some non-limiting embodiments, key exchange server 106a authenticates the first public key based on a first locomotive private key associated with the first train 10. In some non-limiting embodiments, the key exchange server 106a authenticates an access request based on a digital signature of the first train 10 signed with a first on-board key associated with the first train 10.

In some non-limiting embodiments, process 300 includes sending a first on-board key associated with a locomotive 12 of the first train 10 for determining the access response. For example, in some non-limiting embodiments, remote server 106 (e.g., central office server, etc.) receives a first locomotive address associated with a locomotive 12 of the first train 10 (e.g., dependent locomotive, etc.) from a first train 10 for determining the access response.

In some non-limiting embodiments, remote server 106 generates a locomotive key request including a first locomotive's address, a first locomotive public key, a DH modulus, and a DH base. In some non-limiting embodiments, remote server 106 sends the message to a second locomotive 22 after signing the message with the second locomotive private key of the second locomotive.

As shown in FIG. 3, at step 308, process 300 includes authenticating the second public key of the second train based on a second locomotive private key associated with the second train. For example, in some non-limiting embodiments, the key exchange server 106a (e.g., central office server, etc.) authenticates the second public key of the second train 20 based on a second locomotive private key associated with the second train 20. For example, the key exchange server 106a (e.g., central office server, etc.) authenticates the second public key of the second train 20 based on the locomotive private key associated with locomotive 22.

In some non-limiting embodiments or aspects, the key exchange server 106a (e.g., central office server, etc.) digitally signs the second public key of the second train 20 before sending the digitally signed second public key to the first train 10. For example, the key exchange server 106a signs the second public key with a private key of the first locomotive 12 before sending the digitally signed second public key to the first train 10.

In some non-limiting embodiments, remote server 106 generates a locomotive key response including a second locomotive's address and public key. In some non-limiting embodiments, remote server 106 sends the message to a first locomotive after signing with a locomotive key of a locomotive 12.

In some non-limiting embodiments, the locomotive-to-central office message and the central office-to-locomotive message are authenticated based on a predetermined private key associated with a respective locomotive.

As shown in FIG. 3, at step 310, process 300 includes generating a shared secret key based on the first secret random number and the second public key authenticated by the central server. For example, in some non-limiting embodiments, on-board computer 102 generates a shared secret key based on the first secret random number and the second public key authenticated by the central server. In some non-limiting embodiments, the on-board computer 102 stores the first secret random number until obtaining the second public key to generate the shared secret key (e.g., a shared secret key of the first train, etc.).

In some non-limiting embodiments or aspects, the on-board computer 102 receives the second public key and authenticates the second public key based on a locomotive private key associated with the first train before generating the shared secret key (e.g., a shared secret key of the first train and the second train, etc.). For example, the on-board computer 102 receives the second public key after the key exchange server 106a digitally signs the second public key with a private key of the first locomotive 12. For example, the on-board computer 102 prevents a MITM by authenticating the second public key before generating a shared secret key.

As shown in FIG. 3, at step 312, process 300 includes generating the shared secret key based on the second secret random number and the first public key authenticated by the central server. For example, in some non-limiting embodiments, on-board computer 102 generates the shared secret key based on the second secret random number and the first public key authenticated by the central server.

In some non-limiting embodiments or aspects, the on-board computer 104 receives the first public key and authenticates the first public key based on a private key associated with the second locomotive before generating the shared secret key (e.g., a shared secret key of the first train and the second train, etc.). In some non-limiting embodiments, the on-board computer 102 receives the second public key after the key exchange server 106a digitally signs the second public key with a private key of the first locomotive 12.

For example, the on-board computer 104 prevents a MITM by authenticating the first public key before generating a shared secret key. In some non-limiting embodiments, the first train 10 (e.g., on-board computer 102, etc.) generates a first public key based on the first secret random number. In some non-limiting embodiments, the second on-board computer 104 stores the shared secret key (e.g., a shared secret key of the second train, etc.).

As shown in FIG. 3, at step 314, process 300 includes securing a communication with a shared secret key based on at least one of the first public key or the second public key. For example, in some non-limiting embodiments, key exchange server 106a (e.g., central office server, etc.) secures a communication with a shared secret key based on at least one of the first public key or the second public key.

In some non-limiting embodiments, process 300 includes determining a shared secret key based on a public key and a secret random number. For example, on-board computer 102 and/or on-board computer 104 determines a shared secret key based on a public key and a secret random number.

In some non-limiting embodiments, process 300 includes securing at least one peer-to-peer communication channel between the first on-board computer communication device 102a of the first train 10 and the second on-board computer communication device 104a of the second train 20 based on the shared secret key. For example, on-board computer 102 secures at least one peer-to-peer communication channel between the first communication device of the first train 10 and the second communication device of the second train 20 based on the shared secret key. For example, in some non-limiting embodiments, on-board computer 102, on-board computer 104, and/or remote server 106 prevents a man-in-the-middle attack by securing (e.g., authenticating, etc.) at least one of locomotive-to-central office communication, central office-to-locomotive communication, or locomotive-to-locomotive communication.

In some non-limiting embodiments, process 300 includes communicating train data and/or movement information between the first train 10 and the second train 20 via the at least one secure peer-to-peer communication channel. For example, on-board computer 102 communicates train data between the first train 10 and the second train 20 via the at least one secure peer-to-peer communication channel. For example, in some non-limiting embodiments, a train-to-train message (e.g., peer-to-peer, locomotive-to-locomotive, etc.) is authenticated based on the shared secret key.

Figure 4A:
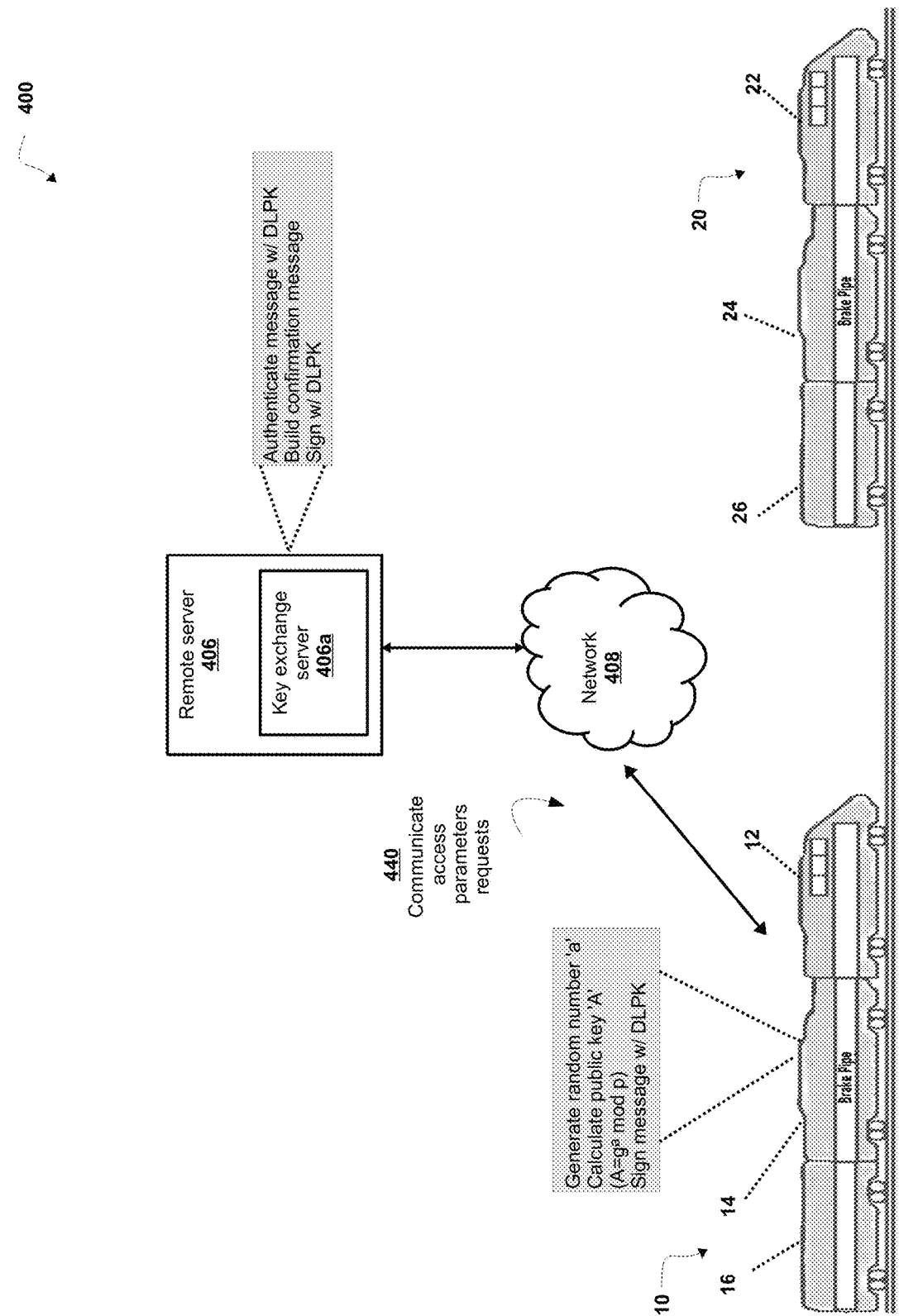
FIGS. 4A-4C illustrate an implementation of a non-limiting embodiment or aspect of a process disclosed herein according to some non-limiting embodiments or aspects.
Figure 4B:
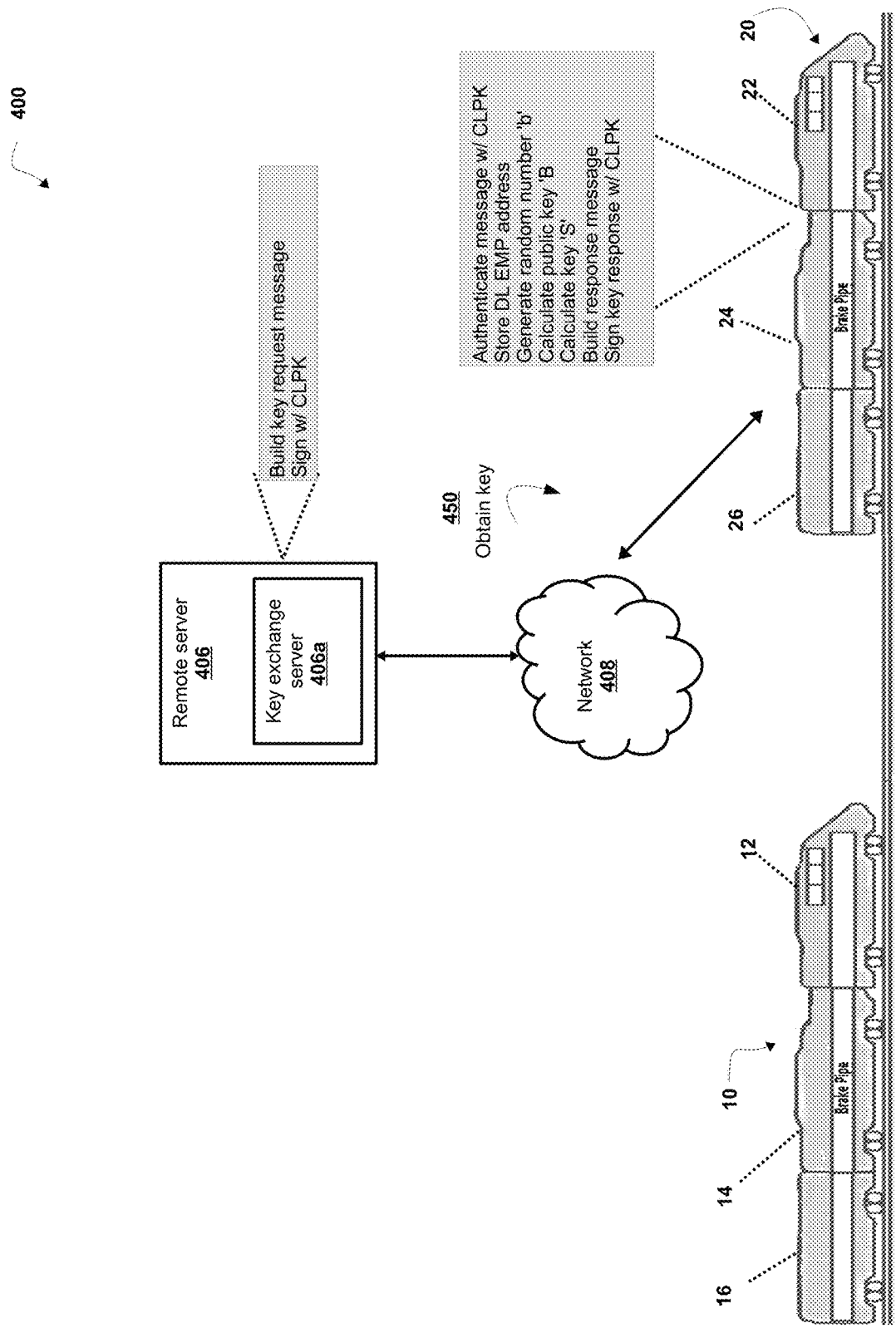
Figure 4C:
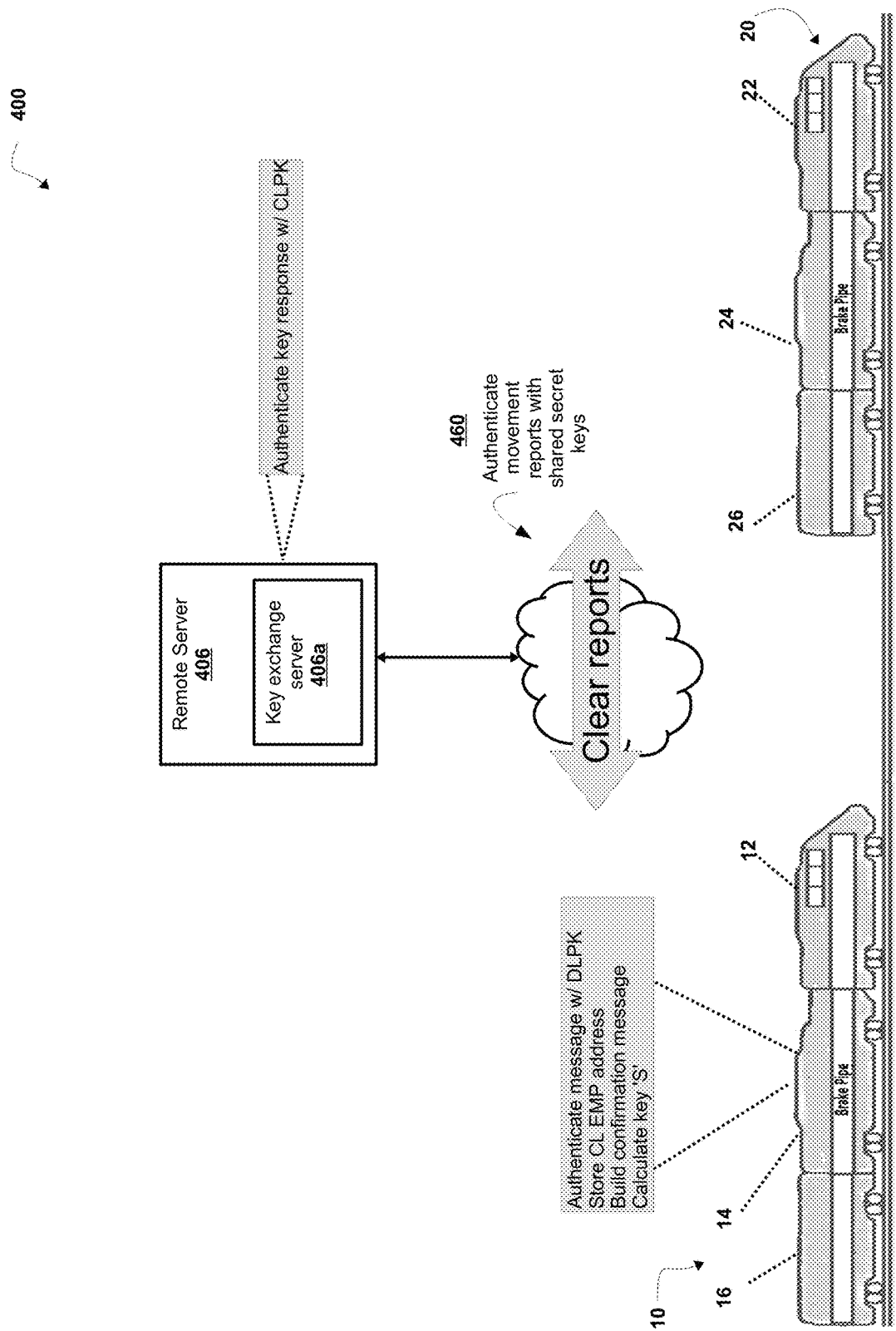

Referring now to FIGS. 4A-4C, FIGS. 4A-4C are diagrams of an overview of a non-limiting embodiment of an implementation 400 relating to one or more processes disclosed herein. As shown in FIGS. 4A-4C, implementation 400 includes train 10, locomotive 12, one or more railcars 14, an end of train railcar 16, and train 20, locomotive 22, one or more railcars 24, and an end of train railcar 26. Additionally, implementation 400 includes remote server 406 and key exchange system 406a, communicating via network 408. In some non-limiting embodiments or aspects, remote server 406 can be the same or similar to remote server 106. In some non-limiting embodiments or aspects, key exchange system 406a can be the same or similar to key exchange system 106a. In some non-limiting embodiments or aspects, train 10 and train 20 include on-board computer systems that can be the same or similar to on-board computer systems as described in FIG. 1.

As shown by reference number 440 in FIG. 4A, in some non-limiting embodiments or aspects, implementation 400 includes communicating access parameter requests. For example, in some non-limiting embodiments, locomotive 12 of train 10 communicates an access parameter request to key exchange system 406a or remote server 406. For example, locomotive 12 of train 10 calculates a public key based on generating a secret random number and shared secret key information. In some non-limiting embodiments, locomotive 12 of train 10 communicates the access request including the secret random number, the shared secret key information, and the public key to remote server 406 for initiating a train-to-train key exchange.

In some non-limiting embodiments or aspects, the public key associated with train 10 can decrypt one or more messages encrypted by a shared secret key generated in the implementation, such as, for example, a digital signature of locomotive 12. In some non-limiting embodiments, remote computer 406 authenticates the access request for parameters based on the private key of locomotive 12 to verify a sender of the access request for parameters is locomotive 12. In some non-limiting embodiments or aspects, locomotive 12 digitally signs the access request for parameters with a first train on-board private key (e.g., locomotive private key, etc.) assigned to a locomotive 12 associated with train 10, and the key exchange server 106a at the remote server 106 verifies the digital signature.

As shown by reference number 450 in FIG. 4B, in some non-limiting embodiments or aspects, implementation 400 includes obtaining keys. For example, in some non-limiting embodiments, key exchange system 406a or remote server 406 communicates a request to obtain shared secret keys to locomotive 22 of train 20. For example, in some non-limiting embodiments, the remote server 406 determines an address of train 20 from one or more addresses of one or more trains in a track network (e.g., train database 102c, 104c, and/or a train database associated with the remote key exchange server 406a, etc.) based on the locomotive identifier of the second locomotive, and sends a request for a locomotive key to the remote server 106 based on determining an address of train 20 associated with the locomotive identifier received from train 10. In some non-limiting embodiments, remote server 106 digitally signs a locomotive key request based on the on-board private key assigned to locomotive 22.

In some non-limiting embodiments or aspects, locomotive 22 of train 20 authenticates the request for a locomotive key from remote server 106 by authenticating the digital signature based on the on-board private key for locomotive 22. In some non-limiting embodiments, locomotive 22 of train 20 generates a second train public key based on a secret random number and shared secret key information associated with the public key and stores the shared secret key in an on-board database for communicating with train 10. In some non-limiting embodiments, locomotive 22 of train 20 sends the second locomotive public key to the remote server 106 after digitally signing with the on-board private key for locomotive 22.

In some non-limiting embodiments or aspects, key exchange server 106a authenticates the request for a locomotive key by authenticating the digital signature based on the second train on-board private key.

As shown by reference number 460 in FIG. 4C, in some non-limiting embodiments or aspects, implementation 400 includes authenticating movement reports with shared secret keys. For example, in some non-limiting embodiments, implementation 400 includes train 10 and train 20 authenticating movement reports (e.g., clear reports, etc.) in a locomotive-locomotive communication (e.g., communicated between locomotive 12 of train 10 and locomotive 22 of train 20, etc.). For example, in some non-limiting embodiments, the on-board computer 104 sends a response to locomotive 12 of first train 10 to confirm a registration request for clear reports based on a CRC over the contents of the response to register and the shared secret key to detect changes (e.g., prevent a MITM attack, etc.) to one or more messages between a first locomotive 12 and a second locomotive 22. By way of example, in some non-limiting embodiments, after confirming the registration request, on-board computer 104 and/or on-board computer 102 secures one or more communications by generating a cyclic redundancy check (CRC) over the contents of the one or more requests to register a timestamp and the shared secret key, the receiving locomotive authenticating the request using a shared secret key generated on-board in the key exchange system and method.

Although embodiments or aspects have been described in detail for the purpose of illustration and description, it is to be understood that such detail is solely for that purpose and that embodiments or aspects are not limited to the disclosed embodiments or aspects, but, on the contrary, are intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, many of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A computer-implemented method, comprising:
   receiving, with a central office server, a first secret random number and a first public key based on the first secret random number from a first computing device of a first vehicle;
   receiving, with the central office server, a second secret random number and a second public key based on the second secret random number from a second computing device of a second vehicle;
   authenticating, with the central office server, the first public key of the first vehicle based on a first private key associated with the first vehicle;
   authenticating, with the central office server, the second public key of the second vehicle based on a second private key associated with the second vehicle;
   preventing a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer;
   authenticating at the central office server, the first public key based on a DH modulus, a DH base, and a secret random number, wherein the determined private key includes at least one of a vehicle identifier, a DH modulus, or a DH base; and
   sending a message, with the central office server, to a vehicle associated with a conditional movement authority.

2. The method of claim 1, comprising:
   sending, with the central office server, a vehicle identifier associated with the second vehicle for determining an access request; and
   receiving, with the central office server, a digitally signed first public key from the first computing device based on the first private key, wherein the first private key is assigned to the first vehicle.

3. The method of claim 2, wherein receiving the digitally signed first public key at the central office server further comprises: receiving a request for a vehicle address of the second vehicle including a vehicle identifier associated with the second vehicle.

4. The method of claim 1, comprising: sending, by the central office server, at least one of a first vehicle address associated with the first vehicle or a second vehicle address associated with the second vehicle.

5. The method of claim 1, wherein a second vehicle-to-central office communication and a central office-to-second vehicle communication are authenticated based on a determined private key associated with a respective second vehicle on-board computer.

6. A vehicle-to-vehicle key exchange system, comprising:
   a central office server comprising one or more processors configured to:
      receive from a first on-board computer of a first vehicle a first secret random number and a first public key based on the first secret random number; and
      receive, from the first on-board computer of the first vehicle, a digitally signed first public key based on a first private key associated with the first on-board computer;
      receive, from a second on-board computer of a second vehicle, a second secret random number and a second public key based on the second secret random number; and
      receive from the second on-board computer a digitally signed second public key based on a second private key associated with the second on-board computer;
      authenticate the first public key of the first vehicle based on the first private key associated with the first on-board computer of the first vehicle;

authenticate the second public key of the second vehicle based on the second private key associated with the second on-board computer of the second vehicle;

prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer;

authenticate the first public key based on a DH modulus, a DH base, and a secret random number, wherein the determined private key includes at least one of a vehicle identifier, a DH modulus, or a DH base; and send a message, with the central office server, to a vehicle associated with a conditional movement authority.

7. The system of claim 6, wherein the central office server is further configured to:
send an identifier associated with the second vehicle for determining an access request; and
receive the digitally signed first public key based on the first private key, wherein the first private key is assigned to the first vehicle.

8. The system of claim 6, wherein receiving the digitally signed first public key at the central office server further comprises: receiving a request for a vehicle address including an identifier of the second vehicle.

9. The system of claim 6, wherein the central office server is further configured to: send at least one of a first vehicle address of the first vehicle or a second vehicle address associated with the second vehicle.

10. The system of claim 6, wherein the vehicle-to-vehicle key exchange system is configured to prevent a man-in-the-middle attack, by securing at least one of a first vehicle-to-central office communication, a central office-to-first vehicle communication, or a first vehicle-to-second vehicle communication.

11. The system of claim 10, wherein the first vehicle-to-central office communications and the central office-to-first vehicle communications are authenticated based on a predetermined private key associated with a respective vehicle on-board computer.

12. A computer program product comprising at least one non-transitory computer-readable medium including program instructions that, when executed by at least one processor, receive a first secret random number and a first public key based on the first secret random number; and receive a digitally signed first public key to a central office server based on a first private key associated with a first vehicle; receive a digitally signed second public key based on a second private key associated with a second vehicle; authenticate the first public key of the first vehicle based on the first private key associated with the first vehicle; authenticate the second public key of the second vehicle based on the second private key associated with the second vehicle, prevent a man-in-the-middle attack, by securing at least one of a first vehicle-to-central office communication, a central office-to-first vehicle communication, or a first vehicle-to-second vehicle, wherein the first vehicle-to-central office communication and the central office-to-first vehicle communication are authenticated based on a determined private key associated with a respective first vehicle on-board computer; authenticating at the central office server, the first public key based on a DH modulus, a DH base, and a secret random number, wherein the determined private key includes at least one of a vehicle identifier, a DH modulus, or a DH base;

and send a message to a vehicle associated with a conditional movement authority.

13. The system of claim 11, wherein a second vehicle-to-central office communication and a central office-to-second vehicle communication are authenticated based on a determined private key associated with a respective second vehicle on-board computer.

14. The computer program product of claim 12, wherein the first vehicle-to-central office communications and the central office-to-first vehicle communications are authenticated based on a predetermined private key associated with a respective vehicle on-board computer.

15. The computer program product of claim 14, wherein a second vehicle-to-central office communication and a central office-to-second vehicle communication are authenticated based on a determined private key associated with a respective second vehicle on-board computer.

* * * * *

UNITED STATES PATENT AND TRADEMARK OFFICE
CERTIFICATE OF CORRECTION

PATENT NO. : 11,153,077 B2
APPLICATION NO. : 16/220959
DATED : October 19, 2021
INVENTOR(S) : Rebecca W. Dreasher, Stephen Craven and Matthew Steven Vrba It is certified that error appears in the above-identified patent and that said Letters Patent is hereby corrected as shown below:

In the Claims

In Claim 11 at Column 23, Line 40, the portion reading "office communications" should read --office communication--.

In Claim 11 at Column 23, Line 41, the portion reading "vehicle communications" should read --vehicle communication--.

In Claim 14 at Column 24, Line 34, the portion reading "office communications" should read --office communication--.

In Claim 14 at Column 24, Line 35, the portion reading "vehicle communications" should read --vehicle communication--.

Signed and Sealed this
Eleventh Day of October, 2022

Katherine Kelly Vidal
*Director of the United States Patent and Trademark Office*